Dec. 20, 1960  E. S. GILFILLAN, JR  2,964,946
DIFFERENTIAL THERMOCOUPLE ASSEMBLY
Filed Dec. 30, 1957
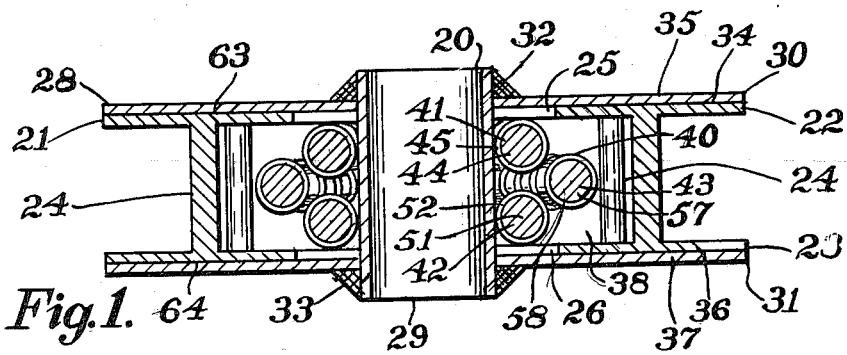
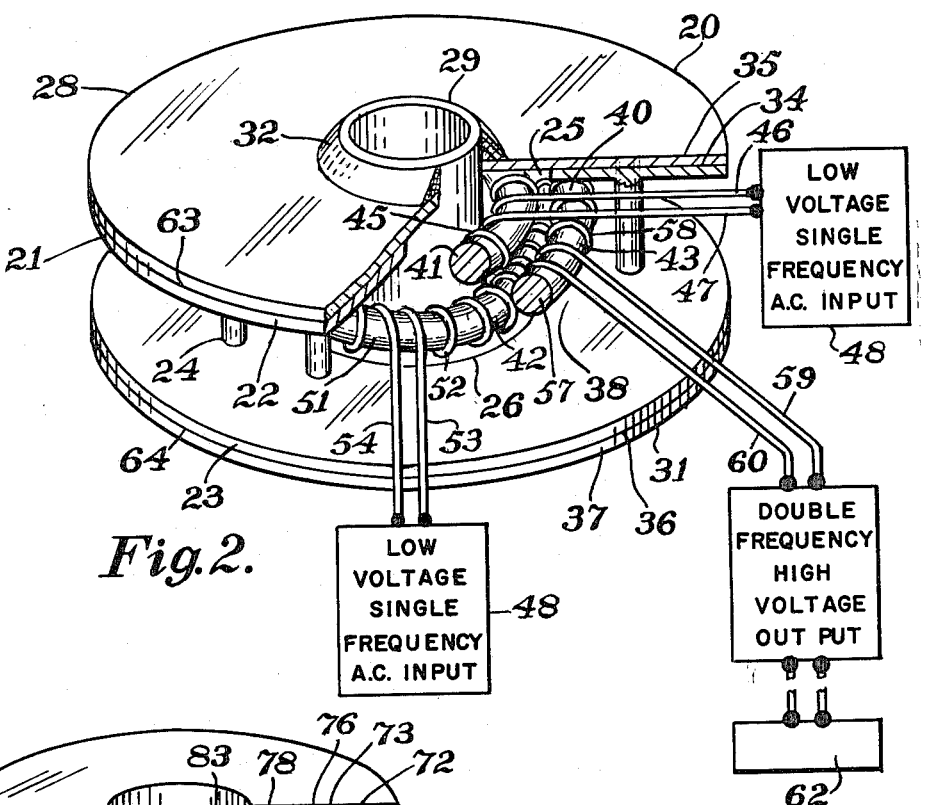
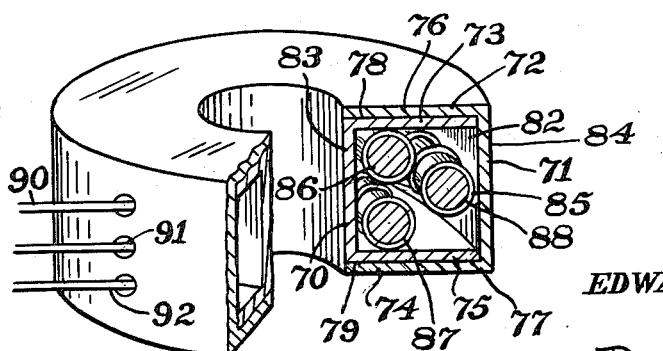
INVENTOR.
EDWARD S. GILFILLAN JR.
BY
Pearson & Pearson
ATTORNEYS

United States Patent Office 2,964,946
Patented Dec. 20, 1960

2,964,946

DIFFERENTIAL THERMOCOUPLE ASSEMBLY

Edward Smith Gilfillan, Jr., Manchester, Mass.

Filed Dec. 30, 1957, Ser. No. 705,836

6 Claims. (Cl. 73—359)

This invention relates to a thermocouple assembly for use in the measurement of differential thermal radiation.

It is well known that two wires of dissimilar metals heated at a junction between them will produce a small voltage. Two such wires are usually termed a "couple" and may be formed of copper and constantan, the latter being a copper-nickel alloy containing 10 to 55% nickel and having constant electric resistivity irrespective of temperature. Such couples may be of the high resistance type made of wires of small diameter or of a low resistance type made of rods of larger diameter such as rods of nickel, steel and copper.

It has heretofore been proposed to measure differential thermal radiation by observing the output of a bank of thermocouples whose alternate junctions are exposed to thermal radiation coming from two opposite directions. To obtain the necessary sensitivity it has been found necessary to employ banks consisting of several thousand thermocouple junctions in series. Such banks are difficult, time consuming and expensive to construct and are impractical for use in research requiring hundreds or thousands of such instruments.

If made of fine wire such banks would probably be delicate and require shielding in which case the shield tends to cause error. If made of rods such banks would be so cumbersome as to be difficult to use in measuring temperatures in restricted spaces. The making of the multiplicity of alternate junctions in such banks is obviously a costly and delicate task.

The principal object of this invention is to provide a thermocouple assembly having the required sensitivity but in which the number of junctions has been reduced to two.

Another object of the invention is to provide a thermocouple assembly in which differential thermal radiation is sensed by an electro magnetic coil system.

A further object of the invention is to provide a simple and rugged thermocouple assembly which can be produced at relatively low cost.

Other objects and advantages of the invention will be apparent from the claims, the description of the drawings and from the drawings in which Fig. 1 is a side elevation in section of a thermocouple assembly in accordance with the invention.

Fig. 2 is a perspective view, partly broken away, of the device shown in Fig. 1 and Fig. 3 is a perspective view, similar to Fig. 2 of a modification.

As shown in Figures 1 and 2 the thermocouple assembly 20 includes a reel-like member 21 having a pair of spaced apart, identical, annular plates 22 and 23, connected by an annular row of posts such as 24. Preferably the member 21 is made of constantan or some other metallic substance having a relatively high thermal E.M.F. against copper and a relatively low thermal conductivity. 25 and 26 represent the upper and lower circular openings in the plates 22 and 23.

Assembly 20 also includes a wheel-like member 28 having a hollow core 29 with a pair of identical, axially spaced, annular plates, or flanges, 30 and 31 fixed proximate each opposite end thereof. The plates 30 and 31 are soldered at 32 and 33 to core 29 or otherwise brought into good electrical contact therewith. Core 29 and plates 30 and 31 are preferably of copper or some other metal having good electrical conductivity and a relatively high thermal E.M.F. against the material of member 21.

The annular plates 22 and 30 are in flatwise engagement with each other along the annular, face to face, junction 34 and constitute one couple 35 of the device, while the annular plates 23 and 31 are in similar flatwise engagement with each other along the annular, face to face, junction 36 to constitute the opposite couple 37 of the device. A closed electric circuit is thus formed including the couple 35, the posts 24, the couple 37 and the core 29, which surrounds the annular space 38.

Within the space 38 a magnetic coil system 40 is symmetrically positioned, the coil system 40 being formed by a pair of exactly similar magnetic coils 41 and 42 and a linking magnetic coil 43 symmetrically arranged with coils 41 and 42. Coil 41 is associated with couple 35 and is a toroid with a ferro magnetic core 44 wrapped with a conductive strand 45 having lead wires 46 and 47 which pass between posts 24 and lead to a source of alternating current 48. Coil 42 is associated with couple 37 and is also a toroid having a ferro magnetic core 51 wrapped with a conductive strand 52 having lead wires 53 and 54 passing between posts 24 to the said source of alternating current 48. Coils 41 and 42 are electrically connected by means of leads 46, 47, 53 and 54 in series in such a way that an alternating current from the low voltage source 48 passes through each of these coils but in opposite directions about them.

The linking coil 43 is preferably outside coils 41 and 42 and is a toroid having a ferro magnetic core 57 wrapped with a conductive strand 58 with lead wires 59 and 60 passing between posts 24 to suitable electronic apparatus 62. The magnetic coil system is linked to the electric circuit of the thermocouple by the current flowing through the electric circuit which is equivalent to a one turn winding on each of the magnetic coils of the system. The term "linking magnetic coil" is used herein to mean any coil threaded by a flux from any source.

The windings of the two inner toroids 41 and 42 are driven in opposite phase by the external source of alternating current 48. When the two exterior annular copper faces 63 and 64 of the thermocouple assembly 20 are exposed to thermal radiation at identical temperatures no current flows through the core 29 and there is no magnetic flux in the outer toroid 43 because the driver flux cancels and there is no other.

When, however, the two opposite faces 63 and 64 are at different temperatures a direct current flows in core 29 and this current links all three toroids of the coil system 40. The effect of this current on the two inner toroids 41 and 42 is to unbalance them electrically and so produce a net alternating flux linked to the electric path surrounding and common to the toroids 41, 42 and 43.

This alternating flux has double the frequency of the driver voltage applied to the inner toroids 41 and 42 and reverses in phase when the current through core 29 is reversed. This flux produces a double frequency voltage in the winding of the outer toroid 43 and this double frequency voltage is brought out by the leads 59 and 60 to the electronic apparatus 62. The double frequency voltage produced in coil 43 is indicative of the differential thermal radiation to which the assembly 20 is exposed and is used for measuring the same in any convenient manner with well known equipment.

For example, it may be compared electronically with a synchronous double frequency voltage produced by a frequency doubler from the voltage used to drive the two inner toroids 41 and 42 in a detector circuit which has a D.C. output which is a replica of the D.C. input from the thermocouples amplified many fold. The voltage produced by coil 43 may also be conveniently measured by a voltmeter connected to the lead wires 59 and 60.

A modification is shown in Fig. 3 wherein an elongated member 70, of C shaped cross section, is formed of one metal such as constantan and another elongated member 71, of reverse C shaped cross section, is formed of a dissimilar metal such as copper. The overlapping flanges 72, 73 and 74, 75 of the members 70 and 71 form couples 76 and 77 with two opposite junctions 78 and 79. A closed electric circuit surrounding the space 82 is formed by the web 83, couple 76, web 84 and couple 77 and a magnetic coil system 85 is symmetrically arranged within space 82. Coil system 85 includes the pair of magnetic coils 86 and 87 and the linking magnetic coil 88 all similar to the corresponding coils 41, 42 and 43 described above. As shown in Fig. 3 the members 70 and 71 are annular and the coils 86, 87 and 88 are toroids with the leads 90, 91 and 92 passing through the web 84 and suitably insulated therefrom. However, the members 70 and 71 could be straight or of configurations other than annular and the ends of the structure could be open for passage of the leads.

I claim:

1. A thermocouple assembly for use in measuring differential thermal radiation, said assembly including a pair of spaced apart, opposite thermocouples in a closed electric circuit each couple being formed of two plates of dissimilar metal in face to face engagement with each other and each adapted to generate current when exposed to thermal radiation; an external source of alternating current; a magnetic coil system positioned between said couples and linked to said electric circuit, said coil system including a pair of magnetic coils driven in opposite phase at an identical driver voltage by said external source of alternating current for producing a net alternating flux in response to the current generated in said plates, at double the frequency of the driver voltage and a linking magnetic coil, inductively energized by said pair of coils, for producing a voltage indicative of said differential thermal radiation, and means responsive to said voltage for indicating said differential thermal radiation.

2. A combination as specified in claim 1 wherein said couples are annular in shape and said coils are toroid in shape.

3. A combination as specified in claim 1 wherein said couples are annular in shape, said coils are toroids and the outer plates of said couples are connected by a hollow core passing through the centre of said toroids.

4. A combination as specified in claim 1 wherein the inner plates of said couples are of constantan, the outer plates of said couples are of copper and the cores of said coils are ferro magnetic.

5. A thermo couple assembly for use in measuring differential thermal radiation, said assembly comprising a closed electric circuit including two opposite, identical pairs of plates of dissimilar metal forming opposite junctions of substantial area for exposure to opposite thermal radiation and a magnetic circuit, symmetrically associated with, and linked with, said electric circuit, said magnetic circuit including a pair of magnetic coils each associated with one of said junctions, means for driving each said coil in opposite phase, a third magnetic coil adapted to produce a net flux linked to said pair of coils at a double frequency voltage and means driven by said voltage for indicating said differential thermal radiation.

6. A thermocouple structure comprising two identical pairs of plates of dissimilar metal, the plates of each pair being in face to face engagement flatwise against each other to form a junction of substantial area for exposure to thermal radiation; conductive means supporting said pairs of plates in spaced apart relation and forming a closed electric circuit therewith and a magnetic coil system mounted in the space between said pairs of plates and linked to said electric circuit when current flows therethrough said system including leads for connection to a source of alternating current and leads for connection to a voltmeter.

References Cited in the file of this patent

UNITED STATES PATENTS

| | | |
|---|---|---|
| 2,585,654 | Hewlett | Feb. 12, 1952 |
| 2,702,828 | Arvin | Feb. 22, 1955 |